United States Patent [19]

Konishi et al.

[11] Patent Number: 4,897,593
[45] Date of Patent: Jan. 30, 1990

[54] REACTIVE POWER COMPENSATOR FOR ELECTRIC POWER SYSTEM

[75] Inventors: Hiroo Konishi; Yasuo Matsuda, both of Ibaraki, Japan

[73] Assignee: Hitachi, Ltd., Tokyo, Japan

[21] Appl. No.: 293,450

[22] Filed: Jan. 4, 1989

[30] Foreign Application Priority Data

Jan. 5, 1988 [JP] Japan .................................. 63-460

[51] Int. Cl.⁴ .............................................. G05F 1/70
[52] U.S. Cl. .................................................. 323/210
[58] Field of Search ............... 323/205, 208, 209, 210, 323/211

[56] References Cited

U.S. PATENT DOCUMENTS

| | | | |
|---|---|---|---|
| 3,942,100 | 3/1976 | Käuferle et al. | 323/210 |
| 4,121,150 | 10/1978 | Kelley, Jr. | 323/210 |
| 4,479,084 | 10/1984 | Ogawa et al. | 323/210 |

FOREIGN PATENT DOCUMENTS

| | | | |
|---|---|---|---|
| 0080554 | 7/1978 | Japan | 323/210 |
| 0127665 | 11/1978 | Japan | 323/210 |
| 0011523 | 2/1981 | Japan | 323/210 |

OTHER PUBLICATIONS

Sunada et al., "Application of Static VAR Compensator for AC/DC Interconnected Power System", IPSC SC14 Symposium, 400-02, (Sep., 1987).

Primary Examiner—Peter S. Wong
Attorney, Agent, or Firm—Antonelli, Terry & Wands

[57] ABSTRACT

A reactive power compensator for an electric power system includes a voltage control circuit which amplifies a differential voltage between the potential command value and a potential signal corresponding to the voltage of the electric power system detected by a potential detector. The voltage control circuit outputs a reactive power compensation control signal. The control signal is fed to a reactive power output circuit which controls the voltage of the power system in order to compensate for reactive power in the power system. A gain calculation circuit is provided for setting the gain of the voltage control circuit to a value proportional to the level of short-circuit capacity of the system power on the system power supply side of the reactive power output circuit.

13 Claims, 2 Drawing Sheets

REACTIVE POWER COMPENSATOR FOR ELECTRIC POWER SYSTEM

BACKGROUND OF THE INVENTION

1. Field of the invention

This invention relates to a reactive power compensator for an electric power system having a voltage control circuit which amplifies the differential voltage between a potential command value and a potential signal corresponding to a system voltage detected by a potential detector and outputs the difference as a reactive power compensation control signal, and a reactive power output circuit which controls the voltage of the electric power system by being supplied with the signal output from the voltage control circuit via a phase control circuit so as to compensate for reactive power in the power system.

2. Description of the Prior Art

Conventionally, a reactive power compensator of this kind is constituted by a closed loop voltage control system in order to constantly maintain the voltage of the electric power system. FIG. 4 is a block diagram of a conventional reactive power compensator which is supplied with a potential command value Vp and which has: an adder SUM for calculating and outputting the difference between the potential command value Vp and a potential signal Vf corresponding to the detected voltage of the electric power system; a voltage control circuit AVR supplied with the output from the adder SUM and outputting a reactive power control signal Δq for controlling the voltage of the electric power system; a phase control circuit APS for phase-controlling and supplying control pulses to a thyristor to control, on the basis the signal Δq output from the voltage control circuit AVR, the current flowing through a reactor which outputs reactive power; a reactive power output device SVC for making a lagging reactive current flow through the reactor on the basis of the control pulses supplied from the phase control circuit APS so as to compensate for reactive power of the electric power system; and a transducer VDT for detecting the voltage of the electric power system and effecting level-shifting of the same. SYS represents characteristics of the system and represents a change in the voltage of the system in response to a change in the reactive power. In this voltage control system of the reactive power compensator, the gain of the voltage control circuit and the delay time constant and the like are controlled in order that the cut-off frequency of the loop transfer function of the closed loop will become equal to a value which satisfies the response condition of the system, and that the phase margin at that frequency will become sufficient. An example of this kind of apparatus is described in APPLICATION OF STATIC VAR COMPENSATOR FOR AC/DC INTERCONNECTED POWER SYSTEM CIGRE SC 14 SYMPOSIUM 400-02 (Sept., 1987).

As is apparent from FIG. 4, in the reactive power compensator based on the above conventional art, the gain of the loop changes abruptly in response to a change in the characteristics of the electric power system, i.e., the impedance of the system because of the characteristic SYS of the electric power system inserted in series in the voltage control loop, even if the gain, the lag time constant or the like of the voltage control circuit is controlled in order to obtain desired response performance and stability of the reactive power compensator. The response and stability of the reactive power compensator are thereby changed also. In general, the impedance of the system changes with time depending upon the power demand on the load side. Conventionally, to cope with this problem, the gain, the lag time constant and the like of the voltage control circuit are adjusted so that the desired response and stability are obtained when the loop gain or the impedance of the system are maximized. In the control system thus adjusted, the response performance deteriorates as the impedance of the electric power system becomes smaller, that is, the loop gain becomes smaller. It is thus difficult to optimize the effects of the reactive power compensator.

SUMMARY OF THE INVENTION

It is an object of the present invention to provide a reactive power compensator for an electric power system which is free from the above-described defect of the conventional art and which is capable of controlling the voltage of the system stably at a high speed.

To this end, the present invention provides a reactive power compensator for an electric power system, having: a voltage control circuit for outputting a reactive power compensation signal by amplifying the differential voltage between a potential command value and a potential signal corresponding to a voltage of the electric power voltage detected by a potential detector; and a reactive power outputting device for controlling the voltage of the electric power system on the basis of the signal output from the voltage control circuit so as to compensate for reactive power in the system power, said compensator comprising a gain calculation circuit for setting the gain of the voltage control circuit to a value proportional to the level of short-circuit capacity of the electric power system on the system power supply side of the reactive power output circuit.

In the reactive power compensator of the present invention for electric power systems, the gain of the voltage control circuit is changed in proportion to the short-circuit capacity of the electric power system on the power supply side of the reactive power outputting device, thereby enabling the voltage of the electric power system to be controlled stably at a high speed irrespective of the system capacity. It is thereby possible to stabilize the power supplied from the electric power system.

DESCRIPTION OF THE PREFERRED EMBODIMENTS

Figure 1:
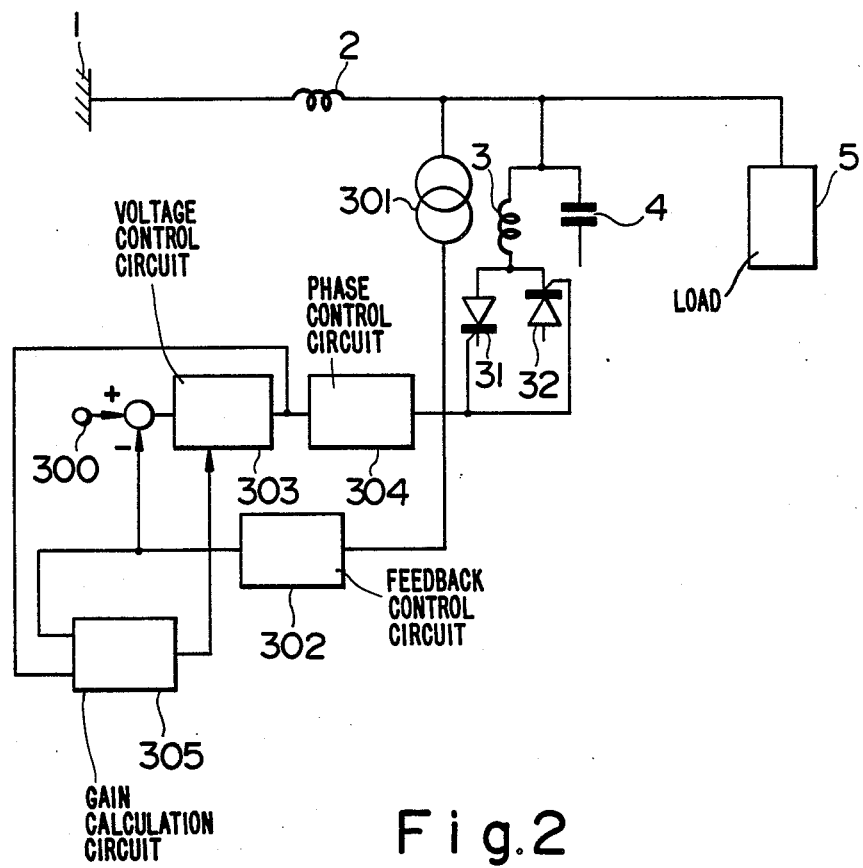
FIG. 1 is a block diagram of a reactive power compensator which represents a first embodiment of the present invention.

FIG. 1 shows a block diagram of a reactive power compensator which represents an embodiment of the present invention. This reactive power compensator is connected to a terminal 1 of a generator or a bus of an infinite system the potential of which is thought to be constant. An ac system impedance 2 is defined between the infinite bus and a load 5. A reactor 3 is adapted to supply lagging reactive power of the reactive compensator to the system. A capacitor 4 is adapted to supply leading reactive power to the electric power system. Thyristors 31 and 32 are connected to each other in an anti-parallel relationship and are adapted to control the current flowing through the reactor 3. A potential command value 300 is supplied from the outside to a voltage control circuit 303 of the reactive power compensator. A potential detector 301 detects the voltage of the electric power system when the load is connected thereto. A feedback control circuit 302 outputs a potential signal corresponding to a voltage level detected by the potential detector 301. A phase control circuit 304 phase-controls and outputs control pulses for making a reactive current flow through the reactor in response to the level of a signal output from the voltage control circuit. These pulses are applied to the gates of the thyristors 31 and 32. A gain calculation circuit 305 calculates the ratio of a change $\Delta Q$ in the reactive power relative to a change $\Delta V$ in the system voltage per predetermined time interval $\Delta t$, namely, the value of $\Delta Q/\Delta V$ from the reactive power control signal output from the voltage control circuit 303 in correspondence with the reactive power of the reactive power compensator and from the output from the feedback control circuit obtained from the detected value of the system voltage. The gain calculation circuit 305 outputs a value proportional to the calculated value to the voltage control circuit 303 as a gain which changes in proportion to the short-circuit capacity of the electric power system.

Figure 2:
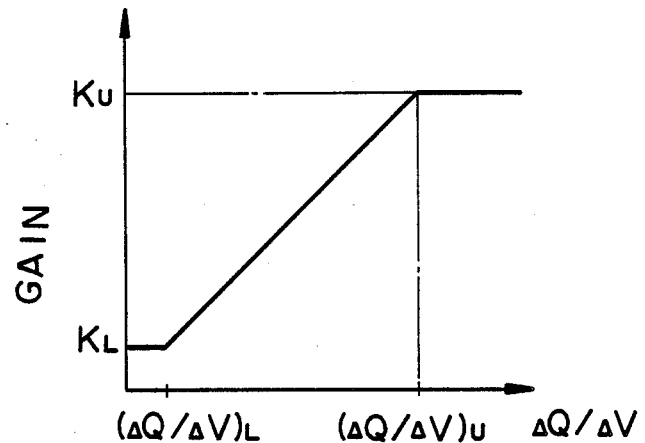
FIG. 2 is a graph of a characteristic of a gain calculation circuit in accordance with the present invention.

FIG. 2 shows an output characteristic of the gain calculation circuit 305. The gain calculation circuit outputs a gain which changes with respect to the value of $\Delta Q/\Delta V$ on the abscissa, as follows. This gain is represented by a constant Kl with respect to a range of $\Delta Q/\Delta V$ below $(\Delta Q/\Delta V)l$, is represented by a constant Ku with respect to a range above $(\Delta Q/\Delta V)u$, and is represented by $Kc(\Delta Q/\Delta V)$ proportional to $\Delta Q/\Delta V$ between these upper and lower values.

Figure 4:
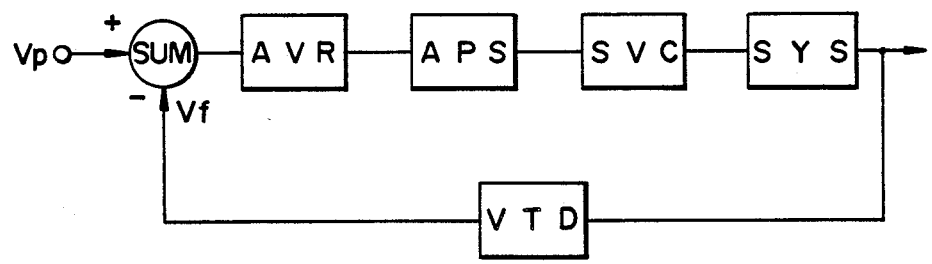
FIG. 4 is a block diagram of a conventional reactive power compensator.

The loop gain of the reactive power compensator for the electric power system in accordance with the present invention is maintained irrespective of the characteristics of the system, as described below. The block diagram of the reactive power compensator shown in FIG. 1 is expressed as FIG. 4. If the gain value received by the voltage control circuit 303 is within the range of proportion to $\Delta Q/\Delta V$ shown in FIG. 2 and if the proportional constant is Kc, the gain is $Kc(\Delta Q/\Delta V)$. Let the gain of the phase control circuit APS be Ka, the gain of the reactive power outputting device SVC be Ks and the gain based on the characteristic of the system be $X=\Delta V/\Delta Q$, the loop gain of K of the arrangement shown in FIG. 4 is represented by $$K=Kc(\Delta Q/\Delta V).Ka.Ks.X=Kc.Ka.Ks$$

which is constant irrespective of the characteristics of the system. Accordingly, if K is determined from conditions for desired response characteristics and stability of the control system, the proportional constant Kc of the gain value received by the voltage control circuit 303 is necessarily determined.

If the reactive power compensator is designed to operate with digital values, $\Delta V$ and $\Delta Q$ can readily be obtained from the differences between the values $V(n-1)$, $Q(n-1)$ of V and Q detected one cycle before and the values $V(n)$, $Q(n)$ of the same obtained at the present time. Also, if the compensator is designed to operate with analog values, they can readily be obtained by inserting delay circuits in V, Q detectors and detecting differences between detected values $\hat{V}$ and $\hat{Q}$ at the present time and values V and Q obtained through delay circuits.

The reason for determination of the gain output characteristics of the gain calculation circuit whereby the gain is set to the constant Kl in the range below $(\Delta Q/\Delta V)l$ or to the constant Ku in the range above $(\Delta Q/\Delta V)u$ is as described below. $\Delta Q$ and $\Delta V$ are unstable at an initial stage of the operation of the reactive power compensator immediately after starting. If the gain is simply set as a value proportional to the value of $\Delta Q/\Delta V$, the gain fluctuates to a large extent in response to a large fluctuation in the value of $\Delta Q/\Delta V$, and the control becomes unstable. Also, there is a possibility of the gain decreasing excessively such that the compensator cannot operate when the value of $\Delta Q/\Delta V$ is small. Consequently, upper and lower limits of the gain are set relative to the value of $\Delta Q/\Delta V$, and the gain is constantly maintained when $\Delta Q/\Delta V$ becomes higher or lower than the corresponding value.

The time interval at which the changes in $\Delta Q$ and $\Delta V$ are observed may be set to 0.5 to several seconds since the fluctuation in the voltage of the system is considered to be several Hz. There is no need to further reduce the time interval for sampling at a higher rate than this. It is preferable to use the mean values of $\Delta Q$ and $\Delta V$ sampled for several seconds. This method makes it possible to avoid a malfunction of the reactive power compensator due to noise in a practical manner.

In the above embodiment, for detection of $\Delta Q$, the output $\Delta q$ from the voltage controller is used as a signal equivalent to the reactive power Q of the reactive power outputting device. However, it is apparent that $\Delta Q$ can be detected by directly detecting the reactive power Q output from the reactive power outputting device, as in the case of detection of $\Delta V$.

Figure 3:
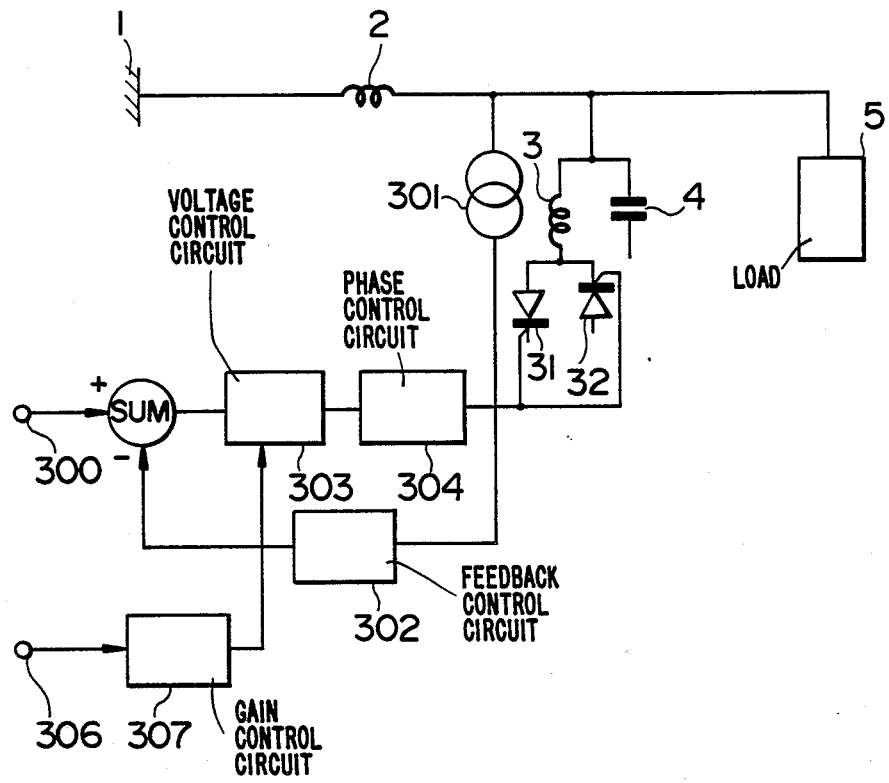
FIG. 3 is a block diagram of a reactive power compensator which represents a second embodiment of the present invention.

FIG. 3 shows another embodiment of the present invention. In the embodiment shown in FIG. 1, the characteristic $(\Delta V/\Delta Q)$ of the system is calculated from signals output from respective sections of the controller in order to determined the voltage control circuit. However, if a central command station or the like which collects and totalizes information on the impedance, the short-circuit capacity, and so on is located near the reactive power compensator and if the state of the system can be ascertained in this station, a method of determining the gain of the voltage control circuit 303 from this information is easier and more reliable. The embodiment shown in FIG. 3 exemplifies a system based on this method. A signal 306 of information on the system is supplied from the central command station. A gain calculation circuit 307 outputs a signal representing a gain on the basis of the information signal. Where the information signal 306 represents information on the impedance of the system, it is possible to set the same characteristics of the gain calculation circuit 307 as those of the gain calculation circuit 305 of the first embodiment if the reciprocal of the impedance is taken. Where the information signal 306 represents information on the short-circuit capacity, the characteristics of the gain calculation circuit 307 may be the same as those of the gain calculation circuit 305 of the first embodiment since the reciprocal of the short-circuit capacity corresponds to the impedance. In either case, the value of the impedance or the short-circuit capacity may be represented on the basis of the reference impedance or short-circuit capacity, and the impedance or the short-circuit capacity can be used as a variable for determining the gain of the voltage control circuit. It is apparent that the second embodiment enables the same effect as that of FIG. 1.

In a method of making the loop gain of the voltage control loop in accordance with the present invention, the change $\Delta Q$ in the reactive power of the reactive power compensator in response to the change $\Delta V$ in the voltage of the system is detected and the gain of the voltage control circuit is set to be proportional to $\Delta Q/\Delta V$. If the impedance of the system on the power supply side of the reactive power outputting device is X, the following equation is obtained:

$$\frac{\Delta V}{\Delta Q} \alpha \frac{\Delta V}{\Delta Iq} = X$$

(where all variables represents p.u values on the rating value base.) $\Delta Iq$ in this equation represents a change in the reactive current. Consequently, if the gain of the voltage control circuit is set to a value proportional to $\Delta Q/\Delta V$, the loop gain of the voltage control loop can be made constant on the basis of the circuit shown in FIG. 4. In this case, $\Delta V$ can be detected from the detected value of the system voltage, and $\Delta Q$ can be from the output from the voltage control circuit AVR since the output AVR corresponds to the reactive power Q obtained as the output from the reactive power compensator SVC in a one-to-one correspondence manner. It is also possible to obtain $\Delta Q$ by directly detecting the reactive power Q from the reactive power outputting device.

As described above, the present invention is advantageous in that the loop gain of the voltage control system of the reactive power compensator can be maintained constantly irrespective of the capacity of the electric power system. It is thereby possible to improve the response performance and stability of the reactive power compensator ir regardless of the capacity of the system.

What is claimed is:

1. A reactive power compensator for an electric power system, comprising:
    (a) a voltage control circuit for amplifying the differential voltage between a potential command value and a potential signal corresponding to the voltage of the electric power system detected by a potential detector, said voltage control circuit outputting said difference as a reactive power compensation control signal;
    (b) a reactive power output circuit supplied with the signal output from said voltage control circuit via a phase control circuit, said reactive power output circuit controlling the voltage of the power system so as to compensate for reactive power in the power system; and
    (c) a gain calculation circuit for setting the gain of said voltage control circuit to a value proportional to the level of short-circuit capacity of the system power on the system power supply side of said reactive power output circuit.

2. A reactive power compensator for an electric power system according to claim 1, wherein said short-circuit capacity is represented by the ratio $\Delta Q/\Delta V$ of a change $\Delta Q$ in the reactive power to a change $\Delta V$ in the voltage of the electric power system per unit time $\Delta t$.

3. A reactive power compensator for an electric power system according to claim 2, wherein said change $\Delta V$ in the voltage of the electric power system and said change $\Delta Q$ in the reactive power are values measured at a time interval of 0.5 to several seconds.

4. A reactive power compensator for an electric power system according to claim 3, wherein said change $\Delta V$ in the voltage of the electric power system and said change $\Delta Q$ in the reactive power are mean values of measured values obtained by measuring said changes several times.

5. A reactive power compensator for an electric power system according to claim 1, wherein said gain calculation circuit outputs a constant gain when said short-circuit capacity is equal to or larger than a predetermined lower value.

6. A reactive power compensator for an electric power system according to claim 5, wherein said gain calculation circuit outputs a constant gain when said short-circuit capacity is equal to or smaller than a predetermined lower value.

7. A reactive power compensator for an electric power system according to claim 1, wherein said short-circuit capacity is represented by the ratio $\Delta q/\Delta V$ of a change $\Delta q$ in the signal output from said voltage control circuit to a change $\Delta V$ in the voltage of the electric power system per unit time $\Delta t$.

8. A reactive power compensator for an electric power system according to claim 7, wherein said change $\Delta V$ in the voltage of the electric power system and said change $\Delta q$ the signal output from said voltage control circuit are values measured at a time interval $\Delta t$ of 0.5 to several seconds.

9. A reactive power compensator for an electric power system according to claim 8, wherein said change $\Delta V$ in the voltage of the electric power system and said change $\Delta q$ in the signal output from said voltage control circuit are mean values of measured values obtained by measuring said changes several times.

10. A reactive power compensator for an electric power system according to claim 7, wherein said gain calculation circuit outputs a constant gain when said short-circuit capacity is equal to or larger than a predetermined upper value.

11. A reactive power compensator for an electric power system according to claim 10, wherein said gain calculation circuit outputs a constant gain when said short-circuit capacity is equal to or smaller than a predetermined lower value.

12. A reactive power compensator for an electric power system according to claim 1, wherein information on said short-circuit capacity is output from a command station for total control of the electric power system.

13. A reactive power compensator for an electric power system according to claim 12, wherein said information on said short-circuit of the electric power is represented by impedance information.

* * * * *